United States Patent [19]

Fesik et al.

[11] 3,979,554
[45] Sept. 7, 1976

[54] SUSPENSION INSULATOR

[76] Inventors: Leonid Nikolaevich Fesik, ulitsa Furmanova, 1, kv. 61; Lev Fedorovich Kovtun, ulitsa Zhukovskogo, 4a, kv. 11; Igor Georgievich Lindenbaum, ulitsa Poligonnaya, 22, kv. 48; Mikhail Mikhailovich Konjuchenko, ulitsa Juria Savchenko, 37, kv. 6, all of Dnepropetrovsk, U.S.S.R.

[22] Filed: June 30, 1975

[21] Appl. No.: 592,072

[52] U.S. Cl. ............................... 174/177; 174/169
[51] Int. Cl.² ......................................... H01B 17/02
[58] Field of Search ............... 174/40 R, 45 R, 146, 174/148, 169, 174, 176, 177, 178, 207, 208; 191/40, 41; 248/58; 267/42, 47, 55, 149, 164

[56] References Cited
UNITED STATES PATENTS

| | | | |
|---|---|---|---|
| 2,918,520 | 12/1959 | Stevens | 174/146 |
| 3,299,586 | 1/1967 | Hockaday | 174/45 R X |

FOREIGN PATENTS OR APPLICATIONS

| | | | |
|---|---|---|---|
| 664,189 | 6/1963 | Canada | 174/45 R |
| A56,696 | 7/1952 | France | 174/177 |

*Primary Examiner*—Laramie E. Askin
*Attorney, Agent, or Firm*—Haseltine, Lake & Waters

[57] ABSTRACT

The proposed suspension insulator is intended to ensure insulated suspension of power line wires to cross-arms of power line supports.

The insulator comprises two flexible, arched insulation members rigidly attached to each other, with their convex sides being on the outside, like in a spring suspension (rigging). The fittings intended for the mechanical connection of the insulator to the cross-arm of a support and for suspending the wire to the insulator are mounted in the middle of the insulation members.

2 Claims, 1 Drawing Figure

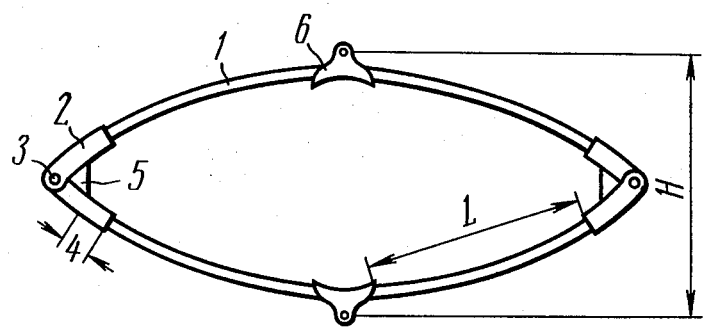

SUSPENSION INSULATOR

BACKGROUND OF THE INVENTION

The present invention relates to electrical engineering and, more specifically, to overhead power lines. Still more particularly, the invention relates to means for insulating wires from supporting structures.

At present there are two basic types of overhead power line insulators. The first type is the insulator string, i.e. a chain of several insulators flexibly joined together. The second type is the solid, or pin insulator. Such insulators are made of porcelain, glass, and polymer materials, or from combinations of said materials, one of whose major characteristics is the ratio $m$ of the leakage path length L to the structural height H. The ratio $m$ refers both to the insulator strings assembled from separate elements and to the solid or pin insulators as well.

The commonest type of insulators for overhead power lines is the suspension disc insulator made of porcelain or quenched glass. Such insulators are assembled into strings with $m = 1.3$ to 2.9, whose leakage path is determined by the line's voltage or by the extent of pollution of the surrounding atmosphere. These insulators have a number of disadvantages: they have a great structural height, are heavy and easily damaged in the course of transportation, assembly and operation (they are easily broken, subject to shooting from firearms).

There is known a great number of different types of composite insulators made from polymer materials in order to reduce their weight and improve their insulation properties. Such insulators comprise a high-tenacity core made of resin-impregnated glass roving, which is subjected to mechanical loads, and an outer casing, ribbed or flat, made of porcelain, ceramic or a polymer material. The internal cavities of such insulators are filled with a polymer material, a liquid dielectric or an inert gas. The end portions of such insulators are sealed, $m=1$ to 1.5 (cf. U.S. Pat. No. 3,014,088, of Dec. 19, 1961; UK Patent Specification No. 873,356 of July 26, 1961; French Patent Specification No. 1,121,187, of July 24, 1956; Federal Germany Patent Specification No. 1,282,122, of Nov. 13,1963).

These insulators, too, have a number pf disadvantages. They are hard to manufacture due to a great number of components which must be accurately fitted to one another. The inner cavities must be sealed to rule out the penetration of moisture and thus eliminate partial electric discharges between the insulator components.

There are further known different types of suspension insulators of simpler designs, which comprise a long glass-fiber laminate rod. The rod may be with or without ribs, with $m=1$ to 1.5, and is a load-carrying element which is suspended to cross-arms of power line supports and thus ensures insulated suspension of wires (cf. U.S. Pat. No. 3,511,922, of Oct. 27, 1967; UK patent Specification No. 775,773, of May 29, 1975; French Patent Specification No. 1,129,593, of Jan. 23, 1957; U.S. Pat. No. 1,515,990, of June 1969).

Although being easier to manufacture than the previously discussed group of insulators, the insulators of the latter type have a disadvantage which is typical of all suspension insulators. The matter is that their leakage path and structural height increase with an increase in the rated voltage of the power line and in the extent of pollution of the surrounding atmosphere. The result is a decreased distance between the wires and the ground, which calls for an increased number of supports per 1 km of the line's length and raises the construction costs of the line.

In order to increase the leakage path in polluted areas without decreasing the distance between the wires and the ground, use is made, apart from conventional insulator strings assembled from separate porcelain or glass suspension insulators, of polymer suspensions of the half-anchor type (cf. Federal Germany Patent Specifications No. 1,204,725, of May 26, 1966, and No. 1,540,108, of Sept. 23, 1971). Such insulators are more advantageous than the previously discussed group, yet, as any half-anchor suspension, they cause an increased load on the support under emergency conditions. As a result, the supports become heavier and the power line construction costs tend to grow.

There are still further known glass-fiber laminate suspension or tension insulators manufactured from resin-impregnated glass roving. At the ends of an insulator there are loops for fittings. The insulators of this type may be with or without ribs in the middle. Such insulators are hard to manufacture, as the production process requires a great number of press molds for separately molding and polymerizing each insulator.

Finally, there is known a ring insulator described in Federal Germany Patent Specification No. 1,169,539, of Dec. 3rd, 1964. This insulator is round or oval-shaped and made from impregnated glass-fiber laminate. The basic disadvantage of this type of insulator is that it has to be made in separate molds, which accounts for its high production costs, since it is extremely difficult to automate the production process. In addition, in this type of insulator with $m = 1.5$ to 3, it is also very difficult to provide an adequate insulation layer across the paths of leakage currents. If an oval-shaped insulator has a very long oval semiaxis, its curvature radii are very small, so the material at these points is subjected to dangerous overloads.

It is an object of the present invention to provide a greater length of leakage current paths, reduce the structural height and simplify the manufacture of insulators.

SUMMARY OF THE INVENTION

The foregoing object is attained by providing an insulator comprising at least two flexible arched members. The arches are rigidly attached to each other with their convex sides being on the outside, like a spring suspension. The insulation members are made of an elastic insulation material, for example, unidirectional glass-reinforced plastic, in which the glass fibers extend along a rod and are pretensioned to ensure an increased bending strength. The end portions of the insulation members are rigidly attached to each other with the aid of metal fittings. To secure the insulator to the cross-arm of a support and suspend the conductor thereto, use is made of conventional clamps mounted in the middle of the insulation members.

BRIEF DESCRIPTION OF THE DRAWING

Other objects and advantages of the present invention will become more apparent from the following detailed description of a preferred embodiment thereof taken in conjunction with the attached drawing showing the proposed suspension insulator.

DESCRIPTION OF THE PREFERRED EMBODIMENT

The suspension insulator of the present invention comprises two arched fiber-glass laminate rods 1. At their ends said rods are attached to each other with the aid of metal fittings 2 provided with pins 3. The fittings 2 are mounted on the rods 1 by being pressed into them at portions 4. The pressing-in operation is performed on a 100-ton press, so that the toughness of the joint is about that of the rods themselves. The convex sides of the rods are on the outside, due to the use of metal wedges 5 welded to the fittings 2. At their upper and lower portions the arched rods 1 are provided with conventional clamps 6 intended to connect the insulators to the cross-arms of supports and suspend the wire to the insulator.

The ratio *m* between the leakage current path length L and its structural height H may be raised to 6 to 7; this figure for oval-shaped insulators, due to the above-mentioned considerations (reduced strength at points with small radii of curvature) is no more than 3 to 4. The rods 1 may be with or without ribs.

The advantage of the proposed insulator includes a greater ratio between the leakage current path to the structural height, which makes it possible to produce insulators of a lesser structural height without affecting their discharge characteristics. The result is fuller use of the height of a power line's supports, a decreased number of supports per 1 km of the line's length, and curtailed construction costs. Besides, ceteris paribus, the insulator of the present invention has a longer leakage current path, i.e. improved discharge characteristics, as compared to other types of insulators. The proposed insulator design accounts for a simplified and technologically effective manufacture of fiber-glass laminate members of the insulator through the use of straight unidirectional glass-reinforced plastic rods produced with the aid of continuous drawing techniques, which reduces the insulator's cost.

What is claimed is:

1. A suspension insulator for insulating wires of a power transmission line suspended from cross-arms of line supports, comprising two straight insulation members of elastic material arched and joined together so that their convex sides face outwardly, the ends of said members being rigidly interconnected by metal endpieces for maintaining the insulation members in an arched condition in the form of a spring suspension, clamp means provided at the middle of one of said members for attaching the insulator to a cross-arm of a power line support and clamp means provided at the middle of the other of said members for attaching a power transmission line to the insulator.

2. A suspension insulator as claimed in claim 1, wherein said insulation members are made of unidirectional glass-reinforced plastic with prestressed glass fibers, to facilitate the manufacturing process, reduce manufacturing costs through the use of a continuous drawing method and to raise mechanical strength.

* * * * *